(12) United States Patent
Paganessi

(10) Patent No.: US 6,668,582 B2
(45) Date of Patent: Dec. 30, 2003

(54) APPARATUS AND METHODS FOR LOW PRESSURE CRYOGENIC COOLING

(75) Inventor: Joseph E. Paganessi, Burr Ridge, IL (US)

(73) Assignee: American Air Liquide, Fremont, CA (US)

( * ) Notice: Subject to any disclaimer, the term of this patent is extended or adjusted under 35 U.S.C. 154(b) by 0 days.

(21) Appl. No.: 10/012,826

(22) Filed: Nov. 13, 2001

(65) Prior Publication Data

US 2003/0074916 A1 Apr. 24, 2003

Related U.S. Application Data

(60) Provisional application No. 60/285,363, filed on Apr. 20, 2001.

(51) Int. Cl.[7] .......................... F25D 3/00; F25D 23/02; F25D 25/04
(52) U.S. Cl. .............. 62/617; 62/639; 62/266; 62/380
(58) Field of Search .................. 62/617, 608, 639, 62/266, 380, 63

(56) References Cited

U.S. PATENT DOCUMENTS

| | | | |
|---|---|---|---|
| 3,299,659 A | * | 1/1967 | Dreksler ........................ 62/266 |
| 3,728,869 A | * | 4/1973 | Schmidt ........................ 62/266 |
| 4,126,436 A | | 11/1978 | Bailey |
| 4,154,592 A | | 5/1979 | Bailey |
| 4,166,799 A | | 9/1979 | Giacobbe |
| 4,208,200 A | | 6/1980 | Claypoole et al. |
| 4,400,190 A | | 8/1983 | Briere |
| 4,437,870 A | | 3/1984 | Miller |
| 4,514,205 A | | 4/1985 | Darcangelo et al. |
| 4,531,959 A | | 7/1985 | Kar et al. |
| 4,594,088 A | | 6/1986 | Paek et al. |
| 4,627,244 A | | 12/1986 | Willhoft |
| 4,659,351 A | * | 4/1987 | Stuber et al. ................ 62/639 |
| 4,664,689 A | | 5/1987 | Davis |

(List continued on next page.)

FOREIGN PATENT DOCUMENTS

| | | |
|---|---|---|
| EP | 0 079 186 A1 | 5/1983 |
| EP | 0 321 182 A2 | 6/1989 |
| JP | 246837 | 10/1987 |
| RU | 1723059 A1 | 3/1992 |
| WO | WO 83 02268 A1 | 7/1983 |

OTHER PUBLICATIONS

Montierth, M.R., "Optical Fiber Drawing Techniques," Optical Spectra, Oct. 1978, pp. 42–48.
National Refrigerants, "Technical Updates: Alternative Refrigerant Terminology,"http://www.refriger nts.com/ltter-m.htm, Aug. 2, 2001, pp. 1–3.
Lavelle, James, "Technical Updates: Understanding Fractionation of Refreigerant Blend," National Refrigerants, http://www.refrigerants.com/undfract.htm, Aug. 2, 2001, pp. 1–4.

(List continued on next page.)

*Primary Examiner*—William C. Doerrler
(74) *Attorney, Agent, or Firm*—Linda K. Russell; Christopher J. Cronin

(57) ABSTRACT

Methods and apparatus for cooling an object using a heat transfer fluid are presented. One of the methods comprises the steps of contacting the object with a heat transfer fluid comprising helium as a major component, the object traversing through a heat exchange unit having an object inlet end and an object outlet end; preventing ingress of contaminants into the heat exchange unit inlet end and outlet end using a seal gas, the seal gas exiting with the heat transfer fluid to form an exit gas; compressing the exit gas to form a compressed recycle gas; routing the compressed recycle gas to a gas-liquid separator, thus forming a helium enriched gas which function as the heat transfer fluid and an enriched liquid; and heating the enriched liquid to form the seal gas.

25 Claims, 6 Drawing Sheets

U.S. PATENT DOCUMENTS

| | | | | |
|---|---|---|---|---|
| 4,666,481 | A | * | 5/1987 | Olson, Jr. .................... 62/608 |
| 4,673,427 | A | | 6/1987 | Van Der Giessen et al. |
| 4,761,168 | A | | 8/1988 | Blyler, Jr. et al. |
| 4,838,918 | A | | 6/1989 | Vaughan et al. |
| 4,913,715 | A | | 4/1990 | Jochem et al. |
| 4,928,492 | A | * | 5/1990 | Howard ......................... 62/63 |
| 4,966,615 | A | | 10/1990 | Linden et al. |
| 4,978,278 | A | * | 12/1990 | Kun ........................... 415/144 |
| 4,988,374 | A | | 1/1991 | Harding et al. |
| 4,995,892 | A | | 2/1991 | Garrett et al. |
| 5,059,229 | A | * | 10/1991 | Blankenship et al. ......... 65/424 |
| 5,160,359 | A | | 11/1992 | Strackenbrock et al. |
| 5,284,499 | A | | 2/1994 | Harvey et al. |
| 5,377,491 | A | | 1/1995 | Schulte |
| 5,511,382 | A | * | 4/1996 | Denis et al. .................. 62/619 |
| 5,568,728 | A | | 10/1996 | Sapsford |
| 5,606,861 | A | | 3/1997 | Renz |
| 5,709,910 | A | * | 1/1998 | Argyle et al. ............ 427/434.2 |
| 5,897,682 | A | | 4/1999 | Koaizawa et al. |
| 5,921,091 | A | | 7/1999 | Foss et al. |
| 6,092,391 | A | | 7/2000 | Chludzinski |
| 6,125,638 | A | | 10/2000 | Ji et al. |
| 6,253,575 | B1 | | 7/2001 | Chludzinski |
| 6,254,666 | B1 | | 7/2001 | Li et al. |
| 6,425,263 | B1 | * | 7/2002 | Bingham et al. ............. 62/613 |
| 6,517,791 | B1 | * | 2/2003 | Jaynes ........................ 423/210 |

OTHER PUBLICATIONS

Rajala, Markku, et al., "Combination Furnace for Drawing Large Optical Fibre Preforms at High Speed," International Wire and Cable Symposium Proceedings, 1998, pp. 483–488.

Holoboff, R., et al., "Gas Quenching with Helium," Advanced Materials & Processes, Feb. 1993, pp. 23–26, vol. 143, No. 2.

Giacobbe, F.W., "Heat Transfer Capability of Selected Binary Gaseous Mixtures Relative to Helium and Hydrogen," Applied Thermal Engineering, 1998, pp. 199–206, vol. 18, Nos. 3–4.

Giacobbe, F.W., "Estimation of Prandtl numbers in binary mixtures of helium and other noble gases," J. Acoust. Soc. Am. 96, Dec. 1994, pp. 3568–3580.

Bammert, K. and Klein, R., "The Influence of He–Ne, He–N2, nd He–CO2, Gas Mixtures and Closed–Cycle Gas Turbines," ASME Reference Paper, 74–GT–124, 1974, pp. 1–8.

McEligot, D.M., et al., "Internal Forced Convection to Mixtures of Inert Gases," Int. J. Heat Mass Transfer, Pergamon Press 1977, pp. 475–486, vol. 20, Great Britain.

Vanco, Michael R., "Analytical Comparison of Relative Heat–Transfer Coefficients and Pressure Drops of Inert Gases and Their Binary Mixtures," National Aeronautics and Space Administration, Feb. 1965, pp. 1–15, Washington, D.C.

Kirk–Othmer, "Fuel Resources to Heat Stabilizers," Encyclopedia of Chemical Technology, 1994, pp. 614–617, 4th Ed., vol. 12.

Hall, W. James, "Concentrating on Reflow's Cooling Zones," www.epp.com, Mar. 2001, pp. 44–51.

Kirov, V.S., et al., "Determination of Heat–Transfer Coefficient for Gas Mixtures Containing Helium and Hydrogen," Odessa Polytechnic Institute, Translated from Inzhenerno–Fizicheskii Zhurnal, Feb. 1974, pp. 152–154, vol. 26, No. 2.

Bird, R.B., et al., Transport Phenomena, 1960, pp.392–393.

McEligot, D.M., et al., "Internal Forced Convection to Mixtures of Inert Gases", Int. J. Heat Mass Transfer, Pergamon Press 1977, pp. 475–486, vol. 20, Great Britain.

Bammert, K., et al., "The Influence of He–Ne, He–N2, and He–CO2, Gas Mixtures and Closed–Cycle Gas Turbines," ASME Reference Paper, 74–GT–124, 1974, pp. 1–8.

Hawlely's Condensed Chemical Dictionary, Twelfth Edition, 1993, p. 525.

* cited by examiner

APPARATUS AND METHODS FOR LOW PRESSURE CRYOGENIC COOLING

CROSS REFERENCE TO RELATED APPLICATIONS

This application claims priority from copending provisional patent application Ser. No. 60/285,363, filed Apr. 20, 2001, incorporated herein by reference.

BACKGROUND OF THE INVENTION

1. Field of the Invention

The invention is generally related to the field of heat transfer. More specifically, the invention relates to recovery of hydrogen or helium in systems using hydrogen or helium as a heat transfer fluid, in conjunction with a second gas, where air contaminants may be problematic.

2. Related Art

Pure or relatively pure hydrogen and helium have excellent heat transfer properties. For example, helium is typically employed to enhance fiber cooling during the optical fiber drawing process because it is chemically inert and because of its heat transfer properties. Of the common pure gases, only hydrogen has a higher thermal conductivity than pure helium.

For example, in optical fiber manufacturing, helium is currently the preferred heat transfer fluid, although other gases have been used, such as hydrogen, argon, nitrogen, even oxygen. Helium, alone or in mixtures, is used during perform lay down, consolidation, in the fiber drawing furnace, and in drawn fiber cooling prior to the application of resin coatings. See for example the following United States patents and other references:

U.S. Pat. No. 4,126,436 (oxygen plus nitrogen); U.S. Pat. No. 4,154,592 (increased addition of helium to mixtures of oxygen and nitrogen produce lower variation in fiber diameter); U.S. Pat. No. 4,400,190 (use of argon as a "gas curtain"); U.S. Pat. No. 4,437,870 (cool dry helium flowed from a porous tube or an annular slot surrounding the fiber); U.S. Pat. No. 4,664,689 (helium, nitrogen, argon, or hydrogen); U.S. Pat. No. 4,673,427 (argon, oxygen, or nitrogen); U.S. Pat. No. 4,761,168 (air, helium, or nitrogen); U.S. Pat. No. 4,838,918 (gaseous nitrogen at room temperature, with liquid nitrogen flowing in hollow parallel plates to cool the gaseous nitrogen); U.S. Pat. No. 4,913,715 (helium and/or hydrogen); U.S. Pat. No. 4,988,374 (use of a removable insert to prevent SiO2 from depositing on the hot fiber); U.S. Pat. No. 5,059,229 (helium/hydrogen mixtures, or hydrogen plus argon, helium, oxygen, nitrogen, and/or air); U.S. Pat. No. 5,160,359 (use of helium, co-currently, with rotation); U.S. Pat. No. 5,284,499 (helium or argon); U.S. Pat. No. 5,377,491 (at least one of helium, nitrogen, hydrogen, carbon dioxide); U.S. Pat. No. 5,897,682 (helium, or helium plus a non-combustible amount of hydrogen, or helium plus nitrogen or argon); U.S. Pat. No. 6,092,391 (use of helium of various purities, depending on unit operation); JP 62-246837 (use of inert gas flowing in a tube such that temperature differential between the inert gas and air is small, supposedly reducing ambient air ingress); EP 321,182 (use of a tubular recovery chamber, and seal between draw furnace and recovery chamber to prevent air ingress into chamber).

Many of the systems discussed in these patent documents are engineering marvels but, unfortunately, are incredibly expensive from an equipment standpoint, and/or are space intensive in their efforts to reduce or eliminate air from the system. This also eliminates nitrogen, which can have beneficial heat transfer aspects. It would be advantageous if apparatus and methods could be developed to take advantage of the heat transfer properties of helium and hydrogen, while reducing the ingress of contaminants into many manufacturing processes. It would be a further advantage in the heat transfer art to efficiently recycle at least a portion of the hydrogen or helium, without using high-pressure equipment and its attendant cost and space requirements.

SUMMARY OF THE INVENTION

In accordance with the present invention, methods and apparatus are presented which reduce or overcome shortcomings in the known methods and apparatus, in particular, where contamination is problematic. Hydrogen and helium are employed as the heat transfer fluids in a heat exchange unit, and a seal gas selected from the group consisting of argon, carbon dioxide, and nitrogen is used as a seal gas. The seal gas and the heat transfer fluid exit the heat transfer unit together, in a mixed or unmixed state. As used herein "contaminant" includes, but is not limited to oxygen, moisture, hydrocarbons such as alkanes, alkenes, alkynes, alcohols, halogenated hydrocarbons, including perfluorinated compounds such as tetrafluoromethane and hexafluoroethane, and the like, but excludes nitrogen, carbon dioxide, and argon. When contaminant is defined in this way, certain advantages may be realized in operating recycle equipment for the combination of gases exiting the heat exchange unit.

A first aspect of the invention is a method of cooling an object, the method comprising:
  a) contacting the object with a heat transfer fluid comprising a major component selected from the group consisting of hydrogen and helium, the object traversing through a heat exchange unit having an object inlet end and an object outlet end;
  b) preventing ingress of contaminants into the heat exchange unit inlet end and outlet end using a seal gas comprising a major component selected from the group consisting of argon, carbon dioxide, and nitrogen, the seal gas exiting with the heat transfer fluid to form an exit gas (either mixed or not);
  c) compressing the exit gas to form a compressed recycle gas;
  d) routing the compressed recycle gas to a condenser where the compressed recycle gas is cooled to form a cooled recycle composition, and routing the cooled recycle composition to a gas-liquid separator, thus forming an enriched gas that functions as the heat transfer fluid, and an enriched liquid, preferably that when vaporized functions as the seal gas; and
  e) preferably heating the enriched liquid to form the seal gas.

The seal gas is preferably receycled, but is not required to be. In other, words, fresh seal gas may be employed. In any event, at least a portion of the heat transfer fluid is recycled.

A second aspect of the invention is a method of cooling an object, the method comprising:
  a) contacting the object with a heat transfer fluid comprising a major component selected from the group consisting of hydrogen and helium, the object traversing through a heat exchange unit having an object inlet end and an object outlet end;
  b) preventing ingress of contaminants into the heat exchange unit inlet end and outlet end using a seal gas comprising a major component selected from the group consisting of argon, carbon dioxide, and nitrogen, the seal gas exiting with the heat transfer fluid to form an exit gas;

c) compressing the exit gas to form a compressed recycle gas;

d) routing the compressed recycle gas to a recycle gas heat exchanger, where the compressed recycle gas exchanges heat with an enriched liquid to form a mixture comprising the seal gas, and a chilled compressed recycle gas;

e) routing the chilled compressed recycle gas to a condenser where the chilled compressed recycle gas is cooled to form a cooled recycle composition, and routing the cooled recycle composition to a gas-liquid separator, thus forming an enriched gas which functions as the heat transfer fluid, and the enriched liquid; and f) preferably routing the enriched liquid to the recycle gas heat exchanger and thus forming the seal gas.

A third aspect of the invention is a method of cooling an object, the method comprising:

a) contacting the object with a heat transfer fluid comprising a major component selected from the group consisting of hydrogen and helium, the object traversing through a heat exchange unit having an object inlet end and an object outlet end;

b) preventing ingress of contaminants into the heat exchange unit inlet end and outlet end using a seal gas comprising a major component selected from the group consisting of argon, carbon dioxide, and nitrogen, the seal gas exiting with the heat transfer fluid to form an exit gas;

c) compressing the exit gas to form a compressed recycle gas;

d) routing the compressed recycle gas to a recuperator, where the compressed recycle gas exchanges heat with an enriched liquid to form a composition comprising the seal gas and a chilled compressed recycle gas, and wherein the compressed recycle gas also exchanges heat with an enriched gas;

e) routing the chilled compressed recycle gas to a condenser where the chilled compressed recycle gas is cooled to form a cooled recycle composition, and routing the cooled recycle composition to a gas-liquid separator, thus forming the enriched gas and the enriched liquid; and f) routing the enriched gas, and preferably the enriched liquid, to the recuperator.

As used herein the term "object" includes, but is not limited to, optical fiber performs, electrical parts such as circuit boards, sub-assemblies, and integrated circuits, metals parts, ceramic parts, and the like. Also, as used herein the term "heat exchange unit" means any apparatus that allows objects to enter and leave a space, either continuously, semi-continuously, or batch-wise, and includes, but is not limited to optical fiber cooling heat exchangers, wave soldering machines, reflow soldering machines, cold treating units, environmental testing cabinets, and the like. It will be understood that in certain preferred embodiments, the object inlet end and object outlet end may be one and the same, as for example in heat exchange units that have a door or "load-lock" apparatus for insertion and removal of objects.

Preferred are methods in accordance with each method aspect of the invention wherein either the temperature, the pressure, or both temperature and pressure of the cooled compressed recycle gas exiting the condenser is controlled to ensure that heat transfer demand in the heat exchange unit is met at the lowest possible pressure, to reduce cost of compression equipment and utilities.

A fourth aspect of the invention is an apparatus comprising:

a) a heat exchange unit for cooling an object having an object inlet end and an object outlet end, and means for allowing a heat transfer fluid selected from the group consisting of hydrogen and helium to contact the object, the heat exchange unit adapted to have the object traverse there through in a mode selected from the group consisting of continuous mode, semi-continuous mode, or batch mode;

b) means for preventing ingress of contaminants into the heat exchange unit object inlet end and object outlet end, the means for preventing ingress of contaminants adapted to use a seal gas selected form the group consisting of argon, carbon dioxide, and nitrogen, the means for preventing ingress of contaminants allowing the seal gas to exit the heat exchange unit with the heat transfer fluid to form an exit gas;

c) means for compressing the exit gas to form a compressed recycle gas;

d) means for routing the compressed recycle gas to a condenser where the compressed recycle gas is cooled to form a cooled recycle composition, and means for routing the cooled recycle composition to a gas-liquid separator, thus forming an enriched gas that functions as the heat transfer fluid, and an enriched liquid; and e) preferably means for heating the enriched liquid to form the seal gas.

A fifth embodiment of the invention is an apparatus comprising:

a) a heat exchange unit for cooling an object having an object inlet end and an object outlet end, and means for allowing a heat transfer fluid selected from the group consisting of hydrogen and helium to contact the object, the heat exchange unit adapted to have the object traverse there through in a mode selected from the group consisting of continuous mode, semi-continuous mode, or batch mode;

b) means for preventing ingress of contaminants into the heat exchange unit object inlet end and object outlet end, the means for preventing ingress of contaminants adapted to use a seal gas comprising a major component selected from the group consisting of argon, carbon dioxide, and nitrogen, the means for preventing ingress of contaminants allowing the seal gas to exit with the heat transfer fluid to form an exit gas;

c) means for compressing the exit gas to form a compressed recycle gas;

d) means for routing the compressed recycled gas to a recycle gas heat exchanger allowing exchange of heat between the compressed recycle gas and an enriched liquid, thus adapted to form a chilled compressed recycle gas and a composition comprising the seal gas;

e) means for routing the chilled compressed recycle gas to a condenser where the chilled compressed recycle gas is cooled to form a cooled recycle composition, and means for routing the cooled recycle composition to a gas-liquid separator, thus forming an enriched gas which functions as the heat transfer fluid, and forming the enriched liquid; and f) preferably means for routing the enriched liquid to the recycle gas heat exchanger and thus forming the seal gas.

A sixth aspect of the invention is an apparatus comprising:

a) a heat exchange unit for cooling an object having an object inlet end and an object outlet end, and means for allowing a heat transfer fluid selected from the group consisting of hydrogen and helium to contact the object, the heat exchange unit adapted to have the object traverse there through in a mode selected from the group consisting of continuous mode, semi-continuous mode, or batch mode;

b) means for preventing ingress of contaminants into the heat exchange unit object inlet end and object outlet end, the means for preventing ingress of contaminants adapted to use a seal gas selected from the group consisting of argon, carbon dioxide, and nitrogen as a major component, the means for preventing ingress of contaminants allowing seal gas to exit with the heat transfer fluid to form an exit gas;

c) means for compressing the exit gas to form a compressed recycle gas;

d) means for routing the compressed recycle gas to a recuperator, where the compressed recycle gas exchanges heat with an enriched liquid to form a composition comprising the seal gas and a chilled compressed recycle composition, and wherein the compressed recycle gas also exchanges heat with an enriched gas;

e) means for routing the chilled compressed recycle composition to a condenser where the chilled compressed recycle composition is cooled to form a cooled recycle composition, and routing the cooled recycle composition to a gas-liquid separator, thus forming the enriched gas and the enriched liquid; and f) preferably means for routing the enriched liquid and the enriched gas to the recuperator.

Further aspects and advantages of the invention will become apparent by reviewing the description of preferred embodiments that follows.

BRIEF DESCRIPTION OF THE DRAWING FIGURES

FIGS. 1, 2, and 3 are schematic process flow diagrams of three embodiments of the invention;

DESCRIPTION OF PREFERRED EMBODIMENTS

The inventor herein has discovered that by simple temperature and/or pressure control of a condenser in a heat transfer fluid loop, one can very significantly save in compression equipment expenses and utilities in heat transfer systems employing a gaseous heat transfer fluid selected from the group consisting of hydrogen and helium, when mixed with a seal gas selected from the group consisting of argon, carbon dioxide, and nitrogen. More specifically, the inventor has determined that these gas mixtures are extremely sensitive to operating temperature and pressure of the condenser and used to separate gas from liquid during recycling of these gases. This very useful discovery will become apparent from review of the following description of preferred embodiments.

Figure 1:
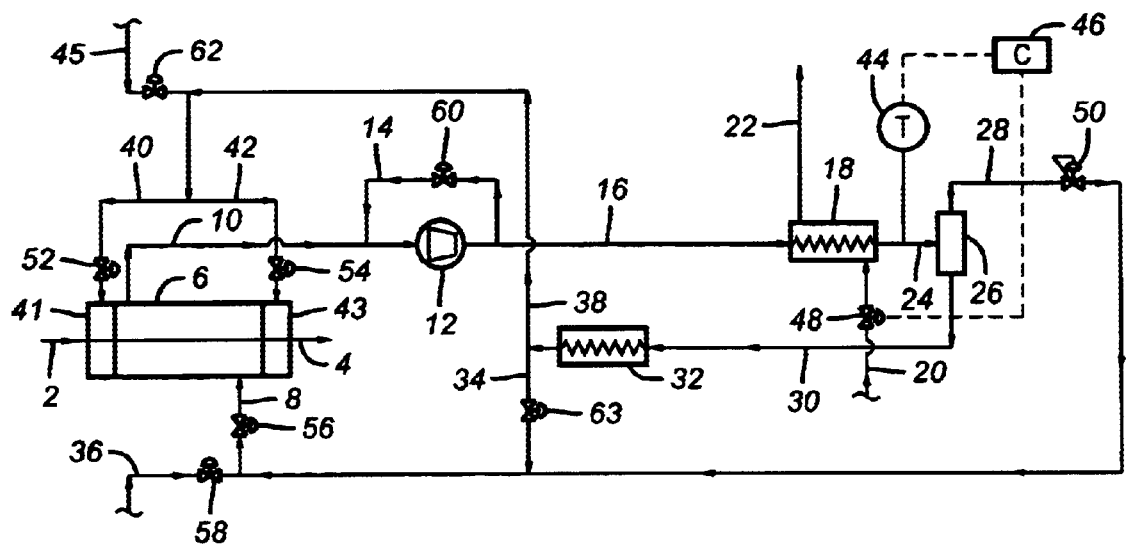

Referring now to the figures, FIG. 1 illustrates an object, for example an optical fiber preform 2, entering a heat exchange unit 6 and exiting at 4. A cooling gas comprising a major portion of hydrogen or helium enters the heat exchange unit for direct contact heat exchange at 8 and exits through conduit 10. The warmed hydrogen or helium travels through conduit 10 and eventually is fed to a compressor 12. Compressor has a bypass conduit 14, which allows some of the compressed gas in conduit 16 to be recycled back to the feed conduit 10. The compressed gas flowing through conduit 16 reaches a condenser 18. A liquid nitrogen stream flowing in conduit 20 exchanges heat with the compressed gas in condenser 18, thus forming a warmed nitrogen gas 22 and an exit stream flowing in conduit 24 which is a combined liquid and gas stream. Combined liquid and gas stream flowing in conduit 24 enters a gas-liquid separator 26 which separates into a stream flowing in conduit 28 comprising a hydrogen-rich or helium-rich gas and a stream flowing in conduit 30 comprising liquid-rich in seal gas, for example, argon, nitrogen, or carbon dioxide. The liquid-rich composition flowing through conduit 30 flows through a vaporizer 32, which is heated by conventional means, to form a vapor stream comprising a major portion of seal gas, which then preferably flows in conduit 38, and divides into conduits 40 and 42 and subsequently reaches seals 41 and 43. The stream flowing through conduit 28 flows through a back pressure regulator 50 and through another control valve 56 and conduit 8 before reaching heat exchange unit 6.

As will be appreciated by those skilled in the art, the pressure of seal gas stream in conduits 40 and 42 is such that gas seals 41 and 43 are under a positive pressure, that is, contaminants are substantially kept out of heat exchange unit 6 by virtue of a positive pressure of gas seals 41 and 43. The gaseous atmosphere surrounding the heat exchange unit, including any contaminants therein, is thus substantially prevented from entering the heat exchange unit. However, a minor amount of the surrounding atmosphere will still be entrained along with object 2 entering into heat exchange unit 6. The amount of entrainment will increase with the speed of travel of object 2, as might occur during high production rates. In any case, the seal gas traversing through conduits 40 and 42 and into seals 41 and 43 eventually will mix with the heat transfer fluid (hydrogen or helium) which has directly contacted object 2 and the combination of heat transfer fluid and seal gas exits through conduit 10.

Further completing the embodiment illustrated in FIG. 1 are seal gas makeup conduit 45 and heat transfer fluid makeup conduit 36. Seal gas makeup is controlled via a regulator 62, while helium makeup is controlled via a regulator 58. Furthermore regulators 52, 54 and 56 control the flow of seal gas traversing conduits 40 and 42, and heat transfer fluid traversing conduit 8, respectively. Flow measurement and controllers are not detailed for clarity. Preferred are mass flow controllers.

In one preferred embodiment vaporized seal gas traversing through conduit 38 is diverted through an alternate conduit 34 and regulator 63 to mix with heat transfer fluid traversing in conduit 28.

The embodiment of FIG. 1 illustrates a controller at 46 and a temperature monitor element 44. Temperature element 44 senses temperature of the chilled stream flowing in conduit 24. Conduit 24 will now be recognized as carrying a mixture of heat transfer fluid (for example helium) and seal gas (for example argon). If a temperature of the fluid flowing through conduit 24 increases, this will be sensed by temperature element 44, and controller 46 will increase the flow of cooling cryogenic fluid in conduit 20 via control valve 48. Alternatively, or in conjunction with the temperature control loop, backpressure regulator 50 operates to further control the degree of cooling of the fluid in conduit 24. If the pressure in conduit 28 rises to high (defined by the particular system, including heat transfer unit 6, objects being cooled, size of condenser 18), backpressure regulator 50 will open to relieve the pressure. Alternatively, if the pressure in conduit 28 is too low, backpressure conduit 50 will tend to close.

Figure 2:
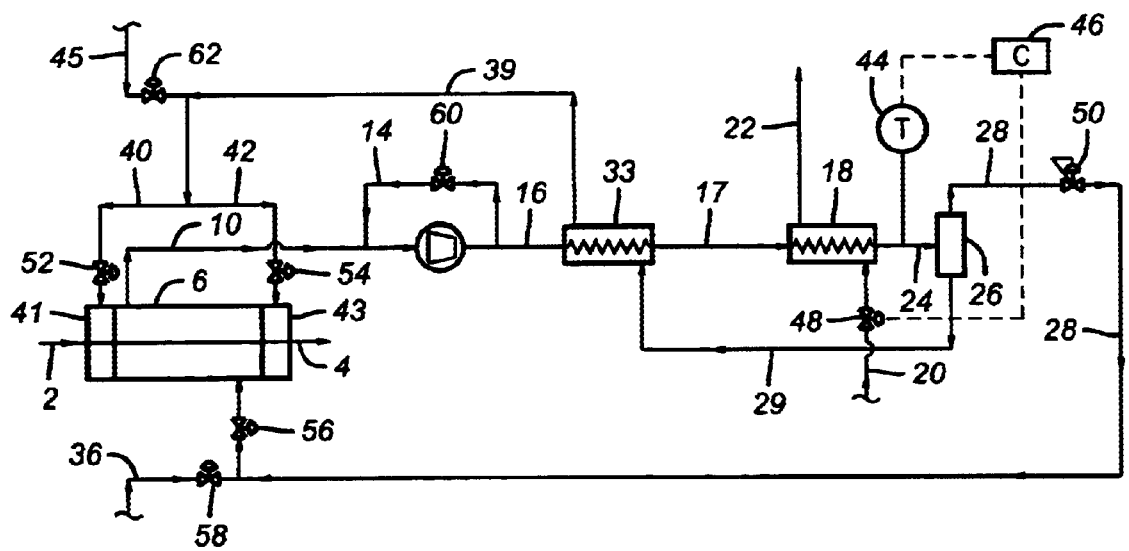

Referring now to FIG. 2, FIG. 2 illustrates a slightly different embodiment of the method and apparatus of invention. The embodiment of FIG. 2 is slightly more efficient in terms of heat recovery and energy efficiency than the embodiment of FIG. 1. A major change is seen in the addition of a heat exchanger 33, which essentially replaces the evaporator 32 of the embodiment of FIG. 1. (It will be understood that an evaporator 32 and a heat exchanger 33 may both be used in alternate embodiments.) As illustrated in FIG. 2, conduit 29 routes seal gas enriched liquid to heat exchanger 33. Fluid flowing in conduit 16 enters heat exchanger 33 to produce a chilled intermediate stream 17 comprising heat transfer fluid and seal gas. Conduit 39 routes the heated and/or vaporized seal gas to conduits 40 and 42, and seals 41 and 43 as described previously. With a reduced size vaporizer 32, more preferably the elimination of vaporizer 32, and the addition of heat exchanger 33, the embodiment of FIG. 2 is more efficient in energy utilization than the embodiment of FIG. 1.

Figure 3:
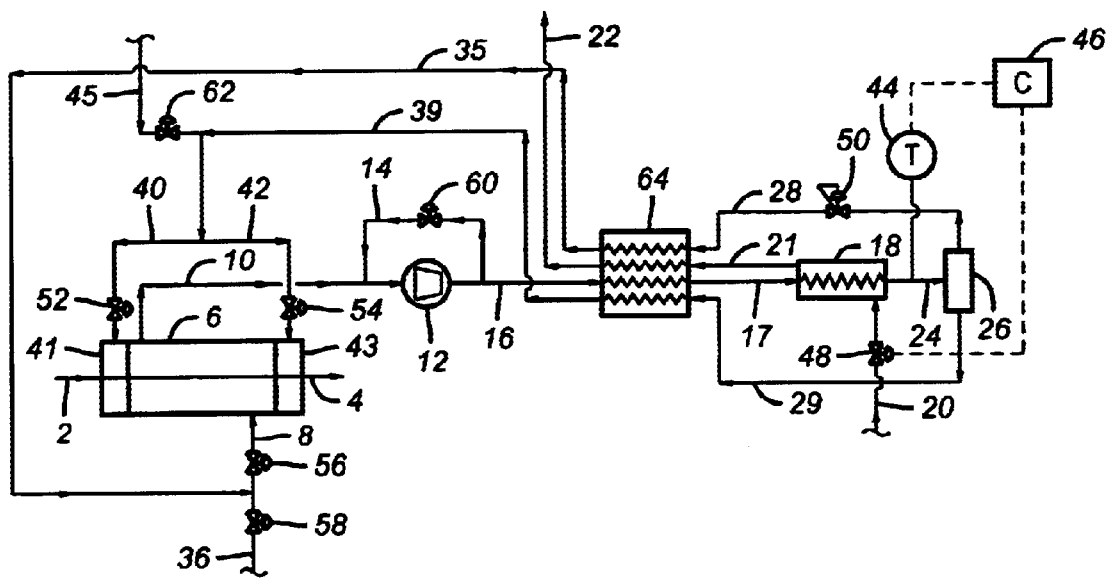

Referring to FIG. 3, the embodiment of FIG. 3 illustrates an even more energy efficient embodiment than that illustrated in FIGS. 1 and 2. The embodiment in FIG. 3 replaces the heat exchanger 33 of FIG. 2 and the vaporizer 32 of FIG. 1 with a recuperator 64. (It will be understood that an evaporator 32, a heat exchanger 33, and a recuperator 64 may all be used in alternate embodiments.) A seal gas enriched liquid flows through conduit 29 and exchanges heat in recuperator 64 with a compressed composition of seal gas and heat transfer fluid flowing through conduit 16, which has a moderate heat content after being compressed in compressor 12. Some of this heat is also exchanged with heat transfer fluid enriched gas flowing in conduit 28 and an intermediate stream 21 flowing from condenser 18 to recuperator 64. The embodiments FIGS. 2 and 3 are each preferably controlled in the same fashion as that described with reference to the embodiment of FIG. 1. That is, the temperature control loop, 44 and 46, combined with or alternating with backpressure controller 50.

Figure 4:
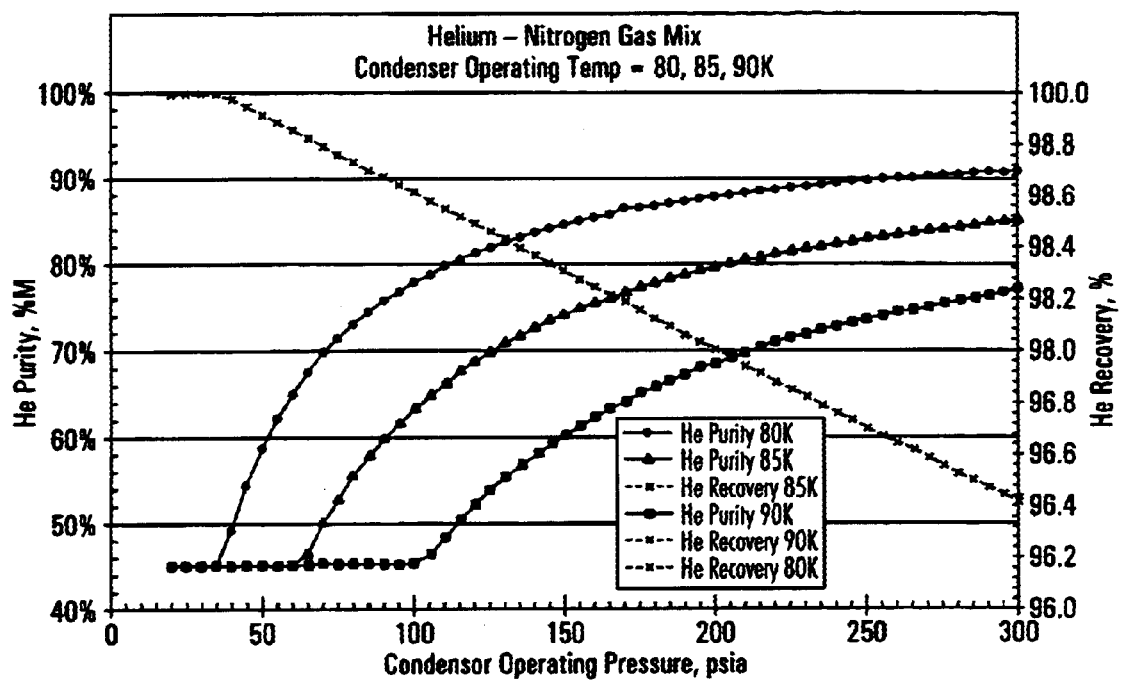
FIG. 4 is a graphical illustration of sensitivity of helium/nitrogen gas mixture for the liquid-gas separator gas stream with condenser operating pressure and temperature.
Figure 5:
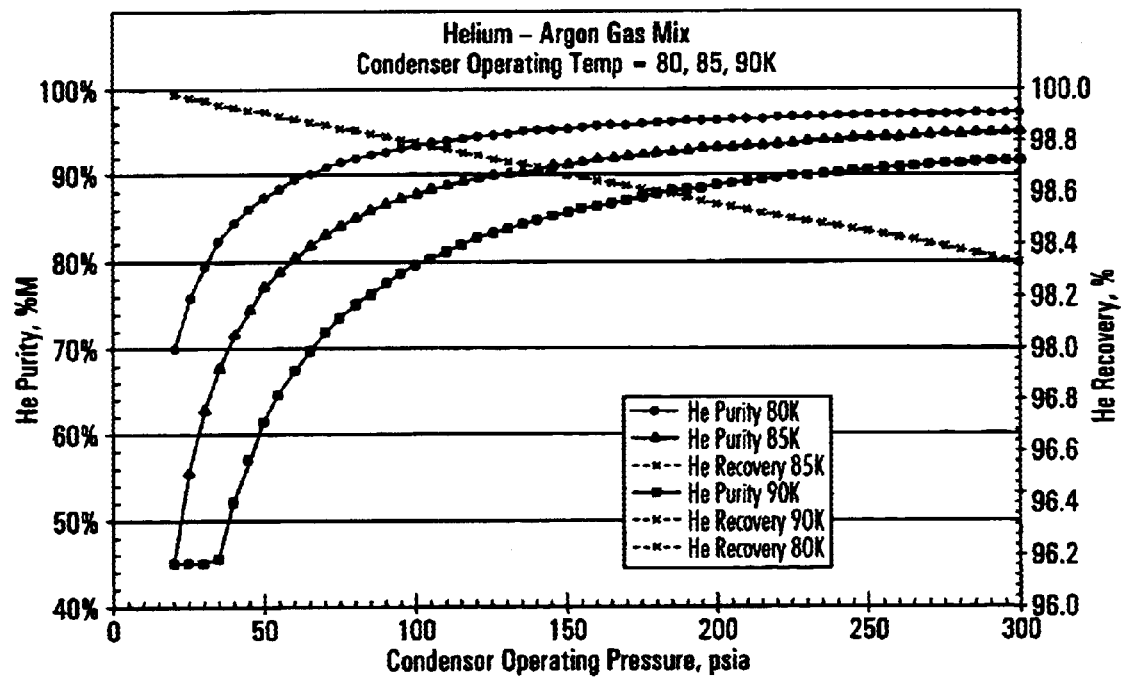
FIG. 5 is a graphical illustration of sensitivity of helium/argon gas mixture for the liquid-gas separator gas stream with condenser operating pressure and temperature.
Figure 6:
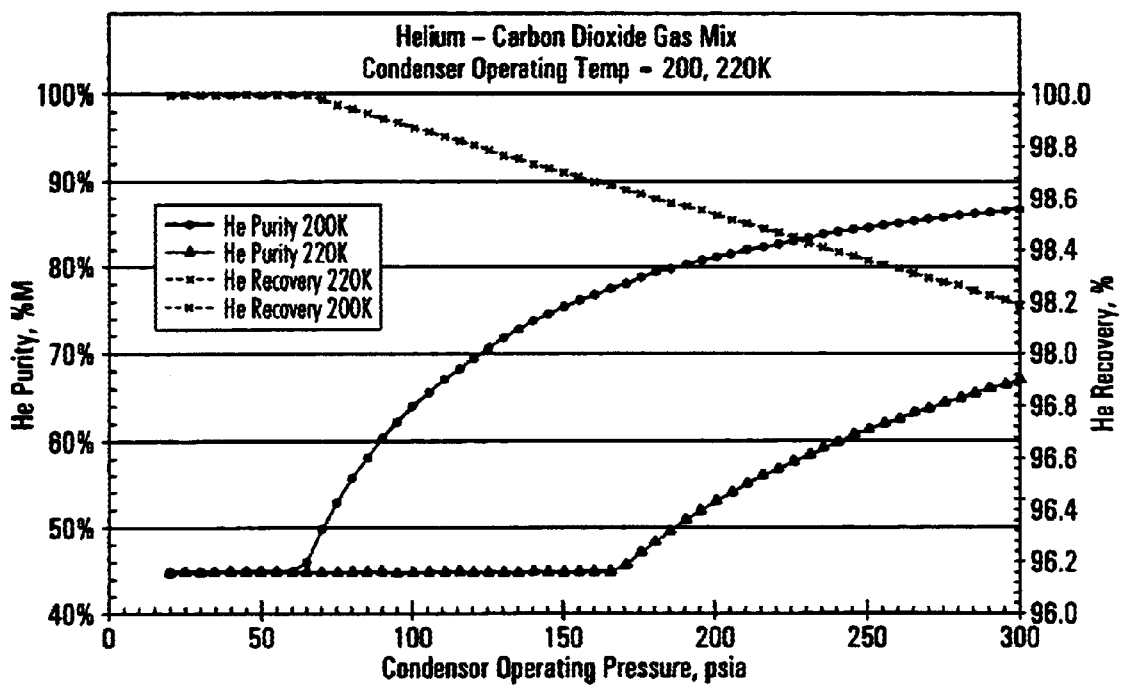
FIG. 6 is a graphical illustration of sensitivity of helium/carbon dioxide gas mixture for the liquid-gas separator gas stream with condenser operating pressure and temperature.
Figure 7:
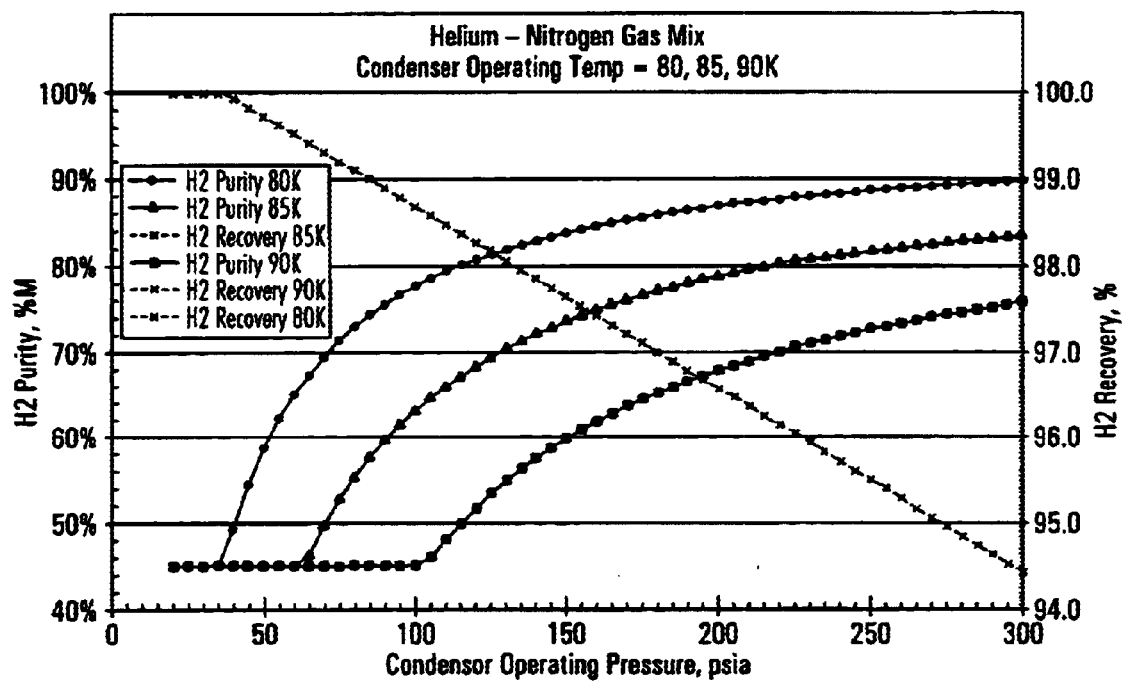
FIG. 7 is a graphical illustration of sensitivity of hydrogen/nitrogen gas mixture for the liquid-gas separator gas stream with condenser operating pressure and temperature.
Figure 8:
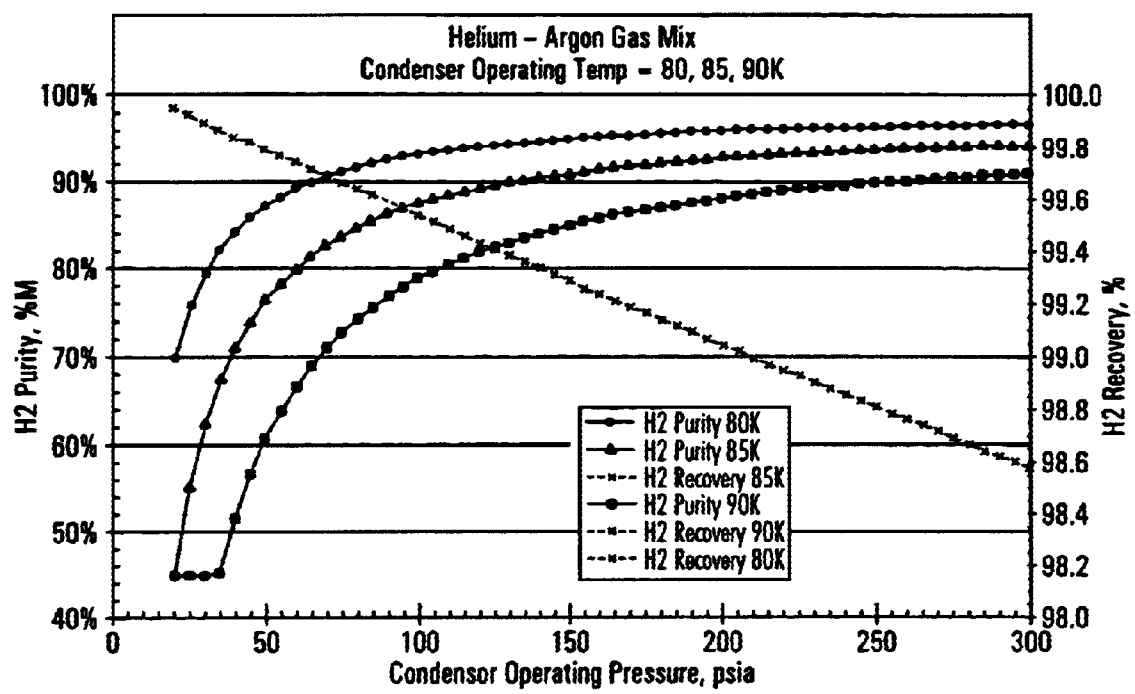
FIG. 8 is a graphical illustration of sensitivity of hydrogen/argon gas mixture for the liquid-gas separator gas stream with condenser operating pressure and temperature.
Figure 9:
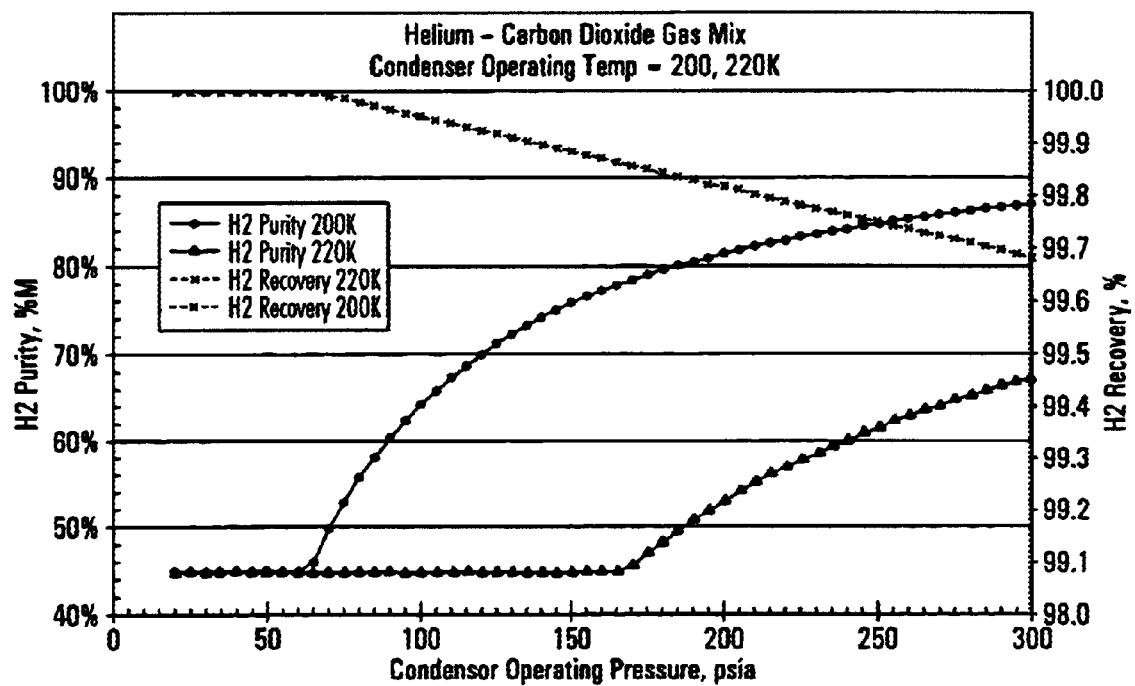
FIG. 9 is a graphical illustration of sensitivity of hydrogen/carbon dioxide gas mixture for the liquid-gas separator gas stream with condenser operating pressure and temperature.

The importance of pressure control, either through the temperature control loop, back pressure control, or a combination of both, is emphasized in FIGS. 4, 5, and 6 for helium mixtures, and FIGS. 7, 8, and 9 for hydrogen mixtures. In these FIGS., the condenser operating pressure is plotted along the X-axis and is defined as the pressure within conduit 24 in each of the embodiments of FIGS. 1, 2 and 3. Along the Y-axis is plotted percent helium (or hydrogen) recovery as well as mole fraction of helium in the stream flowing in conduit 24. FIG. 4 is a graphical illustration of sensitivity of helium/nitrogen gas mixture for the liquid-gas separator gas stream 28 with condenser 18 operating pressure and temperature. For example, for helium heat transfer fluid and nitrogen seal gas, if a designer would like to use a helium purity of 80 mole percent, at a condenser operating temperature of 80 K, the condenser pressure would only have to be about 110 psia and one would obtain a percent helium recovery of about 99.6 percent. However, by increasing the operating temperature of the condenser only 5 degrees to 85 K, at the same helium purity and percent helium recovery, condenser 18 operating pressure rises to about 200 psia. This is if substantially all contaminants are removed or kept out of the system by the use of nitrogen seal gas. An increase of condenser operating temperature to 90 K causes an increase to a condenser operating pressure to above 300 psia.

A similar analysis pertains to the helium/argon system, for example when helium is used as heat transfer fluid and argon is used as the seal gas. FIG. 5 is a graphical illustration of sensitivity of helium/argon gas mixture for the liquid-gas separator gas stream with condenser operating pressure and temperature. For example, if a designer would like to use a helium purity of 80 mole percent, at a condenser operating temperature of 80 K, the condenser operating pressure would only have to be about 65 psia and one would obtain a percent helium recovery of about 99.85 percent. However, by increasing the operating temperature of the condenser only 5 degrees to 85 K, at the same helium purity and percent helium recovery, condenser 18 operating pressure rises to about 125 psia. This is if substantially all contaminants are removed or kept out of the system by the use of argon seal gas. An increase of condenser operating temperature to 90 K causes an increase of condenser operating pressure to above 225 psia.

FIG. 6 is a graphical illustration of sensitivity of helium/carbon dioxide gas mixture for the liquid-gas separator gas stream with condenser operating pressure and temperature. For example, if a designer would like to use a helium purity of 70 mole percent as a heat transfer fluid with carbon dioxide as the seal gas, at a condenser operating temperature of 200 K, the condenser operating pressure would only have to be about 120 psia and one would obtain a percent helium recovery of about 99.5 percent. However, by increasing the operating temperature of the condenser only 20 degrees to 220 K, at the same helium purity and percent helium recovery, condenser 18 operating pressure rises to over 300 psia. This is if substantially all contaminants are removed or kept out of the system by the use of carbon dioxide seal gas.

FIG. 7 is a graphical illustration of sensitivity of hydrogen/nitrogen gas mixture for the liquid-gas separator gas stream 28 with condenser 18 operating pressure and temperature. For example, for hydrogen heat transfer fluid and nitrogen seal gas, if a designer would like to use a hydrogen purity of 80 mole percent, at a condenser operating temperature of 80 K, the condenser pressure would only have to be about 110 psia and one would obtain a percent hydrogen recovery of about 99.6 percent. However, by increasing the operating temperature of the condenser only 5 degrees to 85 K, at the same hydrogen purity and percent hydrogen recovery, condenser 18 operating pressure rises to about 225 psia. This is if substantially all contaminants are removed or kept out of the system by the use of nitrogen seal gas. An increase of condenser operating temperature to 90 K while holding hydrogen purity and percent hydrogen recovery constant causes an increase in condenser operating pressure to above 300 psia.

A similar analysis pertains to the hydrogen/argon system, for example when hydrogen is used as heat transfer fluid and argon is used as the seal gas. FIG. 8 is a graphical illustration of sensitivity of hydrogen/argon gas mixture for the liquid-gas separator gas stream with condenser operating pressure and temperature. For example, if a designer would like to use a hydrogen purity of 90 mole percent, at a condenser operating temperature of 80 K, the condenser operating pressure would only have to be about 60 psia and one would obtain a percent helium recovery of about 99.7 percent. However, by increasing the operating temperature of the condenser only 5 degrees to 85 K, at the same hydrogen purity and percent hydrogen recovery, condenser 18 operating pressure rises to about 135 psia. This is if substantially all contaminants are removed or kept out of the system by the use of argon seal gas. An increase of condenser operating temperature to 90 K causes an increase of condenser operating pressure to about 250 psia.

FIG. 9 is a graphical illustration of sensitivity of hydrogen/carbon dioxide gas mixture for the liquid-gas separator gas stream with condenser operating pressure and temperature. For example, if a designer would like to use a hydrogen purity of 70 mole percent as a heat transfer fluid with carbon dioxide as the seal gas, at a condenser operating temperature of 200 K, the condenser operating pressure would only have to be about 120 psia and one would obtain a percent helium recovery of about 99.5 percent. However, by increasing the operating temperature of the condenser only 20 degrees to 220 K, at the same hydrogen purity and percent hydrogen recovery, condenser 18 operating pressure rises to over 300 psia. This is if substantially all contaminants are removed or kept out of the system by the use of carbon dioxide seal gas.

FIGS. 4–9 illustrate that condenser operating pressure and temperature have a tremendous impact on the operating economics. The size and power requirements of the compression equipment and condensing equipment must be increased tremendously, with only slight changes in operating temperature. It is preferred to utilize helium/argon and hydrogen/argon mixtures, as these have the least sensitivity.

The data generated in FIGS. 4–9 were generated using simulation software known under the trade designation "ASPEN", Version 10.2. In these simulations, "temperature" is temperature of the composition leaving the condenser, where gas and liquid are at equilibrium.

Figure 10:
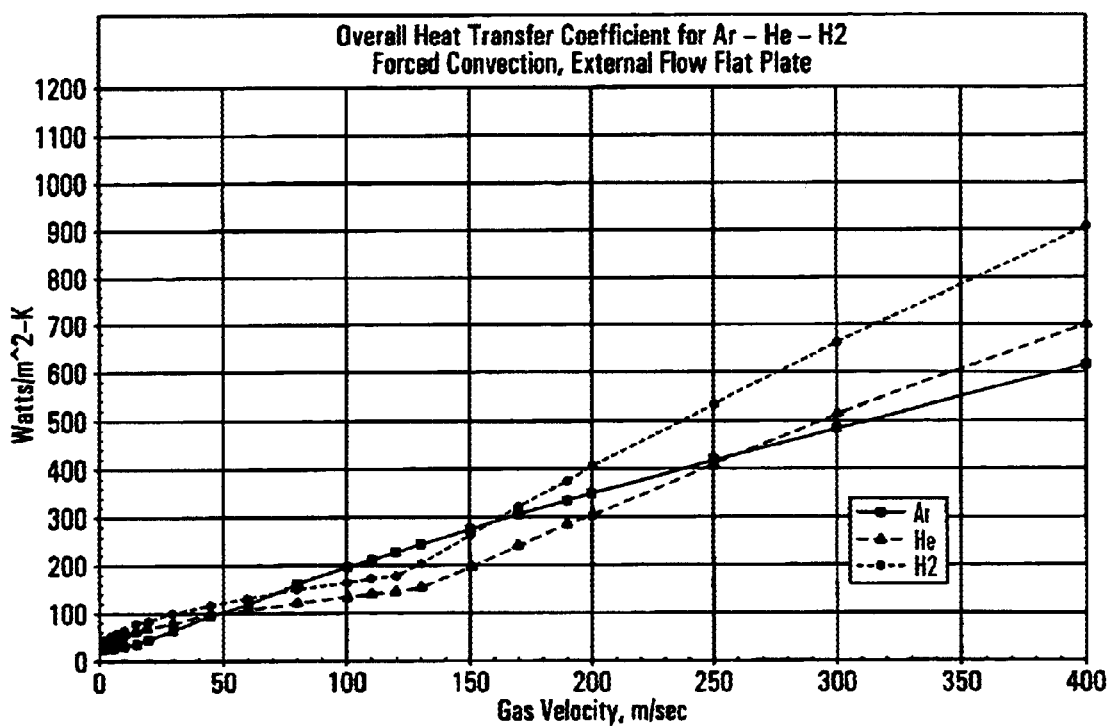
FIG. 10 is a graphical representation of heat transfer coefficients of pure hydrogen, helium, and argon using empirically derived equations based on experimental data.

FIG. 10 illustrates empirically derived equations based on experimental data for forced convection heat transfer coefficients of pure hydrogen, pure helium and pure argon flowing over a flat plate. FIG. 10 illustrates three curves, each having an inflection where transition from laminar to turbulent flow occurs. Note that at velocities ranging from about 75 to about 150 meters/second, argon has a higher heat transfer coefficient than either hydrogen or helium in this transition range, which was unexpected. This can be used to advantage when the heat exchange unit allows convective flow of a heat transfer fluid over objects that are relatively flat, such as printed circuit boards. One might then consider using argon as a heat transfer fluid, and nitrogen as a seal gas, for example.

Although the foregoing description is intended to be representative of the invention, it is not intended to limit the scope of the appended claims.

What is claimed is:

1. A method of cooling an object, the method comprising:
    a) contacting the object with a heat transfer fluid comprising a major component selected from the group consisting of hydrogen and helium, the object traversing through a heat exchange unit having an object inlet end and an object outlet end;
    b) preventing ingress of contaminants into the heat exchange unit inlet end and outlet end using a seal gas comprising a major component selected from the group consisting of argon, carbon dioxide, and nitrogen, the seal gas exiting with the heat transfer fluid to form an exit gas (either mixed or not);
    c) compressing the exit gas to form a compressed recycle gas; and
    d) routing the compressed recycle gas to a condenser where the compressed recycle gas is cooled to form a cooled recycle composition, and routing the cooled recycle composition to a gas-liquid separator, thus forming an enriched gas that functions as the heat transfer fluid, and an enriched liquid.

2. The method of claim 1 wherein at least a portion of the enriched liquid is vaporized and forms a portion of the seal gas.

3. The method of claim 1 wherein at least one temperature or at least one pressure of said cooled recycle composition is controlled by adjusting a flow of a liquid cryogen to said condenser.

4. The method of claim 3 wherein said cryogen is selected from the group consisting of nitrogen, argon, hydrogen, and mixtures thereof.

5. The method of claim 1 wherein a portion of the seal gas comprising argon is mixed with said enriched gas prior to the enriched gas entering the heat exchange unit.

6. A method of cooling an object, the method comprising:
    a) contacting the object with a heat transfer fluid comprising a major component selected from the group consisting of hydrogen and helium, the object traversing through a heat exchange unit having an object inlet end and an object outlet end;
    b) preventing ingress of contaminants into the heat exchange unit inlet end and outlet end using a seal gas comprising a major component selected from the group consisting of argon, carbon dioxide, and nitrogen, the seal gas exiting with the heat transfer fluid to form an exit gas;
    c) compressing the exit gas to form a compressed recycle gas;
    d) routing the compressed recycle gas to a recycle gas heat exchanger, where the compressed recycle gas exchanges heat with an enriched liquid to form a mixture comprising the seal gas, and a chilled compressed recycle gas; and
    e) routing the chilled compressed recycle gas to a condenser where the chilled compressed recycle gas is cooled to form a cooled recycle composition, and routing the cooled recycle composition to a gas-liquid separator, thus forming an enriched gas which functions as the heat transfer fluid, and the enriched liquid, and f) routing the enriched liquid to the recycle gas heat exchanger and thus forming the seal gas.

7. The method of claim 6 wherein at least a portion of the enriched liquid is routed to the recycle gas heat exchanger and thus forming a portion of the seal gas.

8. The method of claim 6 wherein at least one temperature or at least one pressure of said cooled recycle composition is controlled by adjusting a flow of a liquid cryogen to said condenser.

9. The method of claim 8 wherein said cryogen is selected from the group consisting of nitrogen, argon, hydrogen, and mixtures thereof.

10. A method of cooling an object, the method comprising:
   a) contacting the object with a heat transfer fluid comprising a major component selected from the group consisting of hydrogen and helium, the object traversing through a heat exchange unit having an object inlet end and an object outlet end;
   b) preventing ingress of contaminants into the heat exchange unit inlet end and outlet end using a seal gas comprising a major component selected from the group consisting of argon, carbon dioxide, and nitrogen, the seal gas exiting with the heat transfer fluid to form an exit gas;
   c) compressing the exit gas to form a compressed recycle gas;
   d) routing the compressed recycle gas to a recuperator, where the compressed recycle gas exchanges heat with an enriched liquid to form a composition comprising the seal gas and a chilled compressed recycle gas, and wherein the compressed recycle gas also exchanges heat with an enriched gas;
   e) routing the chilled compressed recycle gas to a condenser where the chilled compressed recycle gas is cooled to form a cooled recycle composition, and routing the cooled recycle composition to a gas-liquid separator, thus forming the enriched gas and the enriched liquid; and
   f) routing the enriched gas to the recuperator.

11. The method of claim 10 wherein the enriched liquid is routed to the recuperator.

12. The method of claim 10 wherein at least one temperature or at least one pressure of said cooled recycle composition is controlled by adjusting a flow of a liquid cryogen to said condenser.

13. The method of claim 12 wherein said cryogen is selected from the group consisting of nitrogen, argon, hydrogen, and mixtures thereof.

14. An apparatus comprising:
   a) a heat exchange unit for cooling an object having an object inlet end and an object outlet end, and means for allowing a heat transfer fluid selected from the group consisting of hydrogen and helium to contact the object, the heat exchange unit adapted to have the object traverse there through in a mode selected from the group consisting of continuous mode, semi-continuous mode, or batch mode;
   b) means for preventing ingress of contaminants into the heat exchange unit object inlet end and object outlet end, the means for preventing ingress of contaminants adapted to use a seat gas selected form the group consisting of argon, carbon dioxide, and nitrogen, the means for preventing ingress of contaminants allowing the seat gas to exit the heat exchange unit with the heat transfer fluid to form an exit gas;
   c) means for compressing the exit gas to form a compressed recycle gas; and
   d) means for routing the compressed recycle gas to a condenser where the compressed recycle gas is cooled to form a cooled recycle composition, and means for routing the cooled recycle composition to a gas-liquid separator, thus forming an enriched gas that functions as the heat transfer fluid, and an enriched liquid.

15. The apparatus of claim 14 including means for heating the enriched liquid to form at least a portion of the seal gas.

16. An apparatus comprising:
   a) a heat exchange unit for cooling an object having an object inlet end and an object outlet end, and means for allowing a heat transfer fluid selected from the group consisting of hydrogen and helium to contact the object, the heat exchange unit adapted to have the object traverse there through in a mode selected from the group consisting of continuous mode, semi-continuous mode, or batch mode;
   b) means for preventing ingress of contaminants into the heat exchange unit object inlet end and object outlet end, the means for preventing ingress of contaminants adapted to use a seal gas comprising a major component selected from the group consisting of argon, carbon dioxide, and nitrogen, the means for preventing ingress of contaminants allowing the seal gas to exit with the heat transfer fluid to form an exit gas;
   c) means for compressing the exit gas to form a compressed recycle gas; and
   d) means for routing the compressed recycled gas to a recycle gas heat exchanger allowing exchange of heat between the compressed recycle gas and an enriched liquid, thus adapted to form a chilled compressed recycle gas and a composition comprising the seal gas; means for routing the chilled compressed recycle gas to a condenser where the chilled compressed recycle gas is cooled to form a cooled recycle composition, and means for routing the cooled recycle composition to a gas-liquid separator, thus forming an enriched gas which functions as the heat transfer fluid, and forming the enriched liquid.

17. The apparatus of claim 16 including means for routing the enriched liquid to the recycle gas heat exchanger and thus forming the seal gas.

18. An apparatus comprising:
   a) a heat exchange unit for cooling an object having an object inlet end and an object outlet end, and means for allowing a heat transfer fluid selected from the group consisting of hydrogen and helium to contact the object, the heat exchange unit adapted to have the object traverse there through in a mode selected from the group consisting of continuous mode, semi-continuous mode, or batch mode;
   b) means for preventing ingress of contaminants into the heat exchange unit object inlet end and object outlet end, the means for preventing ingress of contaminants adapted to use a seal gas selected from the group consisting of argon, carbon dioxide, and nitrogen as a major component, the means for preventing ingress of contaminants allowing seal gas to exit with the heat transfer fluid to form an exit gas;
   c) means for compressing the exit gas to form a compressed recycle gas;
   d) means for routing the compressed recycle gas to a recuperator, where the compressed recycle gas exchanges heat with an enriched liquid to form a composition comprising the seal gas and a chilled compressed recycle composition, and wherein the compressed recycle gas also exchanges heat with an enriched gas;

e) means for routing the chilled compressed recycle composition to a condenser where the chilled compressed recycle composition is cooled to form a cooled recycle composition, and routing the cooled recycle composition to a gas-liquid separator, thus forming the enriched gas and the enriched liquid; and f) means for routing the enriched gas to the recuperator.

19. The apparatus of claim 18 including means for routing the enriched liquid to the recuperator.

20. A method of cooling an object, the method comprising:

a) contacting the object with a heat transfer fluid comprising a major component selected from the group consisting of: hydrogen and helium, the object traversing through a heat exchange unit having an object inlet end and an object outlet end;

b) preventing ingress of contaminants into the heat exchange unit inlet end and outlet end by using a seal gas comprising a major component selected from the group consisting of: argon, carbon dioxide, and nitrogen, the seal gas exiting with the heat transfer fluid to form an exit gas (either mixed or not);

c) compressing the exit gas to form a compressed recycle gas; and d) routing the compressed recycle gas to a condenser where the compressed recycle gas is cooled to form a cooled recycle composition to said condenser, wherein at least one temperature or at least one pressure of said cooled recycle composition is controlled by adjusting a flow of a liquid nitrogen, and e) routing the cooled recycle composition to a gas-liquid separator, thereby forming an enriched gas that functions as the heat transfer fluid, and an enriched liquid.

21. A method of cooling an object, the method comprising:

a) contacting the object with a heat transfer fluid comprising a major component selected from the group consisting of: hydrogen and helium, the object traversing through a heat exchange unit having an object inlet end and an object outlet end;

b) preventing ingress of contaminants into the heat exchange unit inlet end and outlet end using a seal gas comprising a major component selected from the group consisting of: argon, carbon dioxide, and nitrogen, wherein said seal gas is equally split between heat exchanger fiber inlet end and heat exchange unit fiber outlet end, the seal gas exiting with the heat transfer fluid to form an exit gas (either mixed or not);

c) compressing the exit gas to form a compressed recycle gas; and d) routing the compressed recycle gas to a condenser where the compressed recycle gas is cooled to form a cooled recycle composition, and routing the cooled recycle composition to a gas-liquid separator, thereby forming an enriched gas that functions as the heat transfer fluid, and an enriched liquid.

22. A method of cooling an object, the method comprising:

a) contacting the object with a heat transfer fluid comprising a major component selected from the group consisting of hydrogen and helium, the object traversing through a heat exchange unit having an object inlet end and an object outlet end;

b) preventing ingress of contaminants into the heat exchange unit inlet end and outlet end using a seal gas comprising a major component selected from the group consisting of: argon, carbon dioxide, and nitrogen, the seal gas exiting with the heat transfer fluid to form an exit gas;

c) compressing the exit gas to form a compressed recycle gas;

d) routing the compressed recycle gas to a recycle gas heat exchanger, where the compressed recycle gas exchanges heat with an enriched liquid to form a mixture comprising the seal gas, and a chilled compressed recycle gas; and e) routing the chilled compressed recycle gas to a condenser where the chilled compressed recycle gas is cooled to form a cooled recycle composition, wherein at least one temperature or at least one pressure of said cooled recycle composition is controlled by adjusting a flow of a liquid nitrogen to said condenser, and f) routing the cooled recycle composition to a gas-liquid separator, thereby forming an enriched gas which functions as the heat transfer fluid, and the enriched liquid, and g) routing the enriched liquid to the recycle gas heat exchanger and thereby forming the seal gas.

23. A method of cooling an object, the method comprising:

a) contacting the object with a heat transfer fluid comprising a major component selected from the group consisting of: hydrogen and helium, the object traversing through a heat exchange unit having an object inlet end and an object outlet end;

b) preventing ingress of contaminants into the heat exchange unit inlet end and outlet end using a seal gas comprising a major component selected from the group consisting of: argon, carbon dioxide, and nitrogen, wherein said seal gas is equally split between heat exchange fiber inlet end and heat exchange unit fiber outlet end, the seal gas exiting with the heat transfer fluid to form an exit gas;

c) compressing the exit gas to form a compressed recycle gas;

d) routing the compressed recycle gas to a recycle gas heat exchanger, where the compressed recycle gas exchanges heat with an enriched liquid to form a mixture comprising the seal gas, and a chilled compressed recycle gas; and e) routing the chilled compressed recycle gas to a condenser where the chilled compressed recycle gas is cooled to form a cooled recycle composition, and routing the cooled recycle composition to a gas-liquid separator, thereby forming an enriched gas which functions as the heat transfer fluid, and the enriched liquid, and f) routing the enriched liquid to the recycle gas heat exchanger and thereby forming the seal gas.

24. A method of cooling an object, the method comprising:

a) contacting the object with a heat transfer fluid comprising a major component selected from the group consisting of hydrogen and helium, the object traversing through a heat exchange unit having an object inlet end and an object outlet end;

b) preventing ingress of contaminants into the heat exchange unit inlet end and outlet end using a seal gas comprising a major component selected from the group consisting of: argon, carbon dioxide, and nitrogen, the seal gas exiting with the heat transfer fluid to form an exit gas; compressing the exit gas to form a compressed recycle gas;

c) routing the compressed recycle gas to a recuperator, where the compressed recycle gas exchanges heat with an enriched liquid to form a composition comprising the seal gas and a chilled compressed recycle gas, and wherein the compressed recycle gas also exchanges heat with an enriched gas; routing the chilled compressed recycle gas to a condenser where the chilled compressed recycle gas is cooled to form a cooled recycle composition, wherein at least one temperature or at least one pressure of said cooled recycle composition is controlled by adjusting a flow of a liquid nitrogen to said condenser;

d) and routing the cooled recycle composition to a gas-liquid separator, thereby forming the enriched gas and the enriched liquid; and e) routing the enriched gas to the recuperator.

25. A method of cooling an object, the method comprising:

a) contacting the object with a heat transfer fluid comprising a major component selected from the group consisting of: hydrogen and helium, the object traversing through a heat exchange unit having an object inlet end and an object outlet end;

b) preventing ingress of contaminants into the heat exchange unit inlet end and outlet end using a seal gas comprising a major component selected from the group consisting of: argon, carbon dioxide, and nitrogen, wherein said seal gas is equally split between heat exchange fiber inlet end and heat exchange unit fiber outlet end, the seal gas exiting with the heat transfer fluid to form an exit gas;

c) compressing the exit gas to form a compressed recycle gas;

d) routing the compressed recycle gas to a recuperator, where the compressed recycle gas exchanges heat with an enriched liquid to form a composition comprising the seal gas and a chilled compressed recycle gas, and wherein the compressed recycle gas also exchanges heat with an enriched gas;

e) routing the chilled compressed recycle gas to a condenser where the chilled compressed recycle gas is cooled to form a cooled recycle composition, and routing the cooled recycle composition to a gas-liquid separator, thereby forming the enriched gas and the enriched liquid; and f) routing the enriched gas to the recuperator.

* * * * *